(12) United States Patent
Benson et al.

(10) Patent No.: US 10,479,411 B2
(45) Date of Patent: Nov. 19, 2019

(54) STRUCTURALLY REINFORCED VEHICLE BODY

(71) Applicant: Toyota Motor Engineering & Manufacturing North America, Inc., Erlanger, KY (US)

(72) Inventors: Blaine C. Benson, Ann Arbor, MI (US); Keith O'Brien, Highland, MI (US); Justin E. Dominic, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/885,587

(22) Filed: Jan. 31, 2018

(65) Prior Publication Data

US 2019/0233017 A1 Aug. 1, 2019

(51) Int. Cl.
*B62D 21/15* (2006.01)
*B62D 25/04* (2006.01)
*B62D 5/04* (2006.01)
*B62D 25/02* (2006.01)
*B60J 5/04* (2006.01)

(52) U.S. Cl.
CPC .......... *B62D 21/157* (2013.01); *B60J 5/0431* (2013.01); *B62D 25/02* (2013.01); *B62D 25/04* (2013.01)

(58) Field of Classification Search
CPC ...... B62D 21/157; B62D 25/04; B62D 25/02; B60J 5/042; B60J 5/0456; B60J 5/0443; B60J 5/0461; B60J 5/0431; B60J 5/0429
See application file for complete search history.

(56) References Cited

U.S. PATENT DOCUMENTS

| 6,302,473 | B1 * | 10/2001 | Weber ................ B60J 5/0443 296/146.6 |
|---|---|---|---|
| 6,364,398 | B1 | 4/2002 | Kim |
| 6,663,166 | B2 | 12/2003 | Achleitner |
| 7,530,624 | B2 | 5/2009 | Endo |
| 8,231,167 | B2 | 7/2012 | Endo et al. |
| 2002/0153742 | A1 | 10/2002 | Ishikawa |
| 2007/0145771 | A1 | 6/2007 | Tanaka et al. |

(Continued)

FOREIGN PATENT DOCUMENTS

| JP | 2016088203 A | 5/2016 |
|---|---|---|
| WO | 2010064290 A1 | 6/2010 |

*Primary Examiner* — Gregory A Blankenship
(74) *Attorney, Agent, or Firm* — Christopher G. Darrow; Darrow Mustafa PC (57) ABSTRACT

A vehicle includes a body that defines a front door opening, and includes an A-pillar framing the front door opening, and a door over the front door opening. The front door includes an inner door panel and an outer door panel defining an interior door cavity therebetween. The vehicle also includes an impact beam and a transfer member housed in the interior door cavity. The impact beam has a forward end that laterally overlaps the A-pillar. The transfer member laterally overlaps the A-pillar in common with the forward end of the impact beam, and faces the inner door panel from laterally between the forward end of the impact beam and the inner door panel. When the vehicle experiences a side impact event, the A-pillar assumes side impact energy via transfer from the forward end of the impact beam through the transfer member.

24 Claims, 7 Drawing Sheets

(56) References Cited

U.S. PATENT DOCUMENTS

| | | |
|---|---|---|
| 2008/0093889 A1 | 4/2008 | Yao |
| 2008/0315619 A1 | 12/2008 | Oka |
| 2009/0085375 A1 | 4/2009 | Fonseka et al. |
| 2010/0148535 A1* | 6/2010 | Takahashi .............. B60J 5/0426 |
| | | 296/187.12 |
| 2011/0031781 A1* | 2/2011 | Nishimura ............. B62D 25/04 |
| | | 296/187.12 |
| 2011/0133515 A1 | 6/2011 | Mori |
| 2013/0062868 A1 | 3/2013 | Itoga et al. |
| 2013/0140845 A1 | 6/2013 | Jeon |
| 2013/0147229 A1 | 6/2013 | Han |
| 2014/0265429 A1 | 9/2014 | Deng et al. |
| 2014/0339855 A1 | 11/2014 | Torii |
| 2016/0152119 A1* | 6/2016 | Tanaka ................... B62D 25/04 |
| | | 296/193.05 |
| 2018/0264919 A1* | 9/2018 | Ando ..................... B60J 5/0437 |
| 2019/0084386 A1* | 3/2019 | Tanaka .................. B60J 5/0425 |

\* cited by examiner

STRUCTURALLY REINFORCED VEHICLE BODY

TECHNICAL FIELD

The embodiments disclosed herein relate to the bodies of passenger vehicles and, more particularly, to structurally reinforcing the bodies against their doors laterally intruding into passenger compartments when the doors are compromised by side impact events.

BACKGROUND

The typical passenger vehicle includes one or more doors. Each door, as part of the vehicle's body, serves as a closure panel for the vehicle's passenger compartment. With the door itself being susceptible to being compromised by side impact events, the vehicle's body sometimes includes a more compromise resistant impact beam housed by the door. When the door is compromised by a side impact event, the impact beam structurally reinforces the body against the door laterally intruding into the passenger compartment.

SUMMARY

Disclosed herein are embodiments of a vehicle whose body is structurally reinforced with an impact beam. In one aspect, a vehicle includes a body that defines a front door opening, and includes an A-pillar framing the front door opening, and a front door over the front door opening. The front door includes an inner door panel and an outer door panel defining an interior door cavity therebetween. The vehicle also includes an impact beam and a transfer member housed in the interior door cavity. The impact beam has a forward end that laterally overlaps the A-pillar. The transfer member laterally overlaps the A-pillar in common with the forward end of the impact beam, and faces the inner door panel from laterally between the forward end of the impact beam and the inner door panel. When the vehicle experiences a side impact event, the A-pillar assumes side impact energy via transfer from the forward end of the impact beam through the transfer member.

In another aspect, a vehicle includes a body that defines a front door opening, and includes an A-pillar framing the front door opening, and a front door over the front door opening. The front door includes an inner door panel and an outer door panel defining an interior door cavity therebetween, and a forward support bracket laterally spaced apart from the outer door panel. The vehicle also includes an impact beam and a transfer member housed in the interior door cavity. The impact beam has a forward end that is supported by the forward support bracket, and that laterally overlaps the A-pillar. The transfer member is also supported by the forward support bracket, and laterally overlaps the A-pillar in common with the forward end of the impact beam. The transfer member projects from the forward support bracket into the interior door cavity toward the inner door panel, and faces the inner door panel from laterally between the forward end of the impact beam and the inner door panel. When the vehicle experiences a side impact event, the A-pillar assumes side impact energy via transfer from the forward end of the impact beam through the transfer member.

In yet another aspect, a vehicle includes a body that defines a front door opening, and includes an A-pillar framing the front door opening, and a front door over the front door opening. The front door includes an inner door panel and an outer door panel defining an interior door cavity therebetween, and a forward support bracket laterally spaced apart from the outer door panel from laterally between the forward end of the impact beam and the inner door panel. The forward support bracket includes opposing support flanges. The vehicle also includes an impact beam and a transfer member housed in the interior door cavity. The impact beam has a forward end that is supported by the forward support bracket in a vertically flanked relationship with the support flanges, and that laterally overlaps the A-pillar. The transfer member includes opposing base flanges respectively corresponding to the support flanges and connected thereto, opposing strut legs respectively projecting from the base flanges into the interior door cavity toward the inner door panel and laterally beyond the impact beam, and a push face extending between the strut legs. The push face laterally overlaps the A-pillar in common with the forward end of the impact beam, and faces the inner door panel from laterally between the forward end of the impact beam and the inner door panel. The transfer member has substantially at least as much capacity to transfer side impact energy in compression as the impact beam has in bending at the forward end thereof. When the vehicle experiences a side impact event, with the transfer member transferring substantially all assumed side impact energy, the A-pillar assumes side impact energy via transfer from the forward end of the impact beam through the transfer member.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle whose front door houses a transfer member in the same space as the forward end of an impact beam. The vehicle has a body that, in addition to the front door, includes an A-pillar framing the corresponding front door opening. With the impact beam having a forward end that laterally overlaps the A-pillar, the transfer member laterally overlaps the A-pillar in common with the forward end of the impact beam, and faces an inner door panel from laterally between the forward end of the impact beam and the inner door panel. When the vehicle experiences a side impact event, the transfer member advances the timing of the A-pillar assuming side impact energy via transfer from the forward end of the impact beam. For purposes of effectuating the A-pillar assuming side impact energy via transfer from the forward end of the impact beam, the transfer member may have substantially the same capacity to transfer side impact energy in compression as the impact beam has in bending at the forward end thereof.

Figure 1:
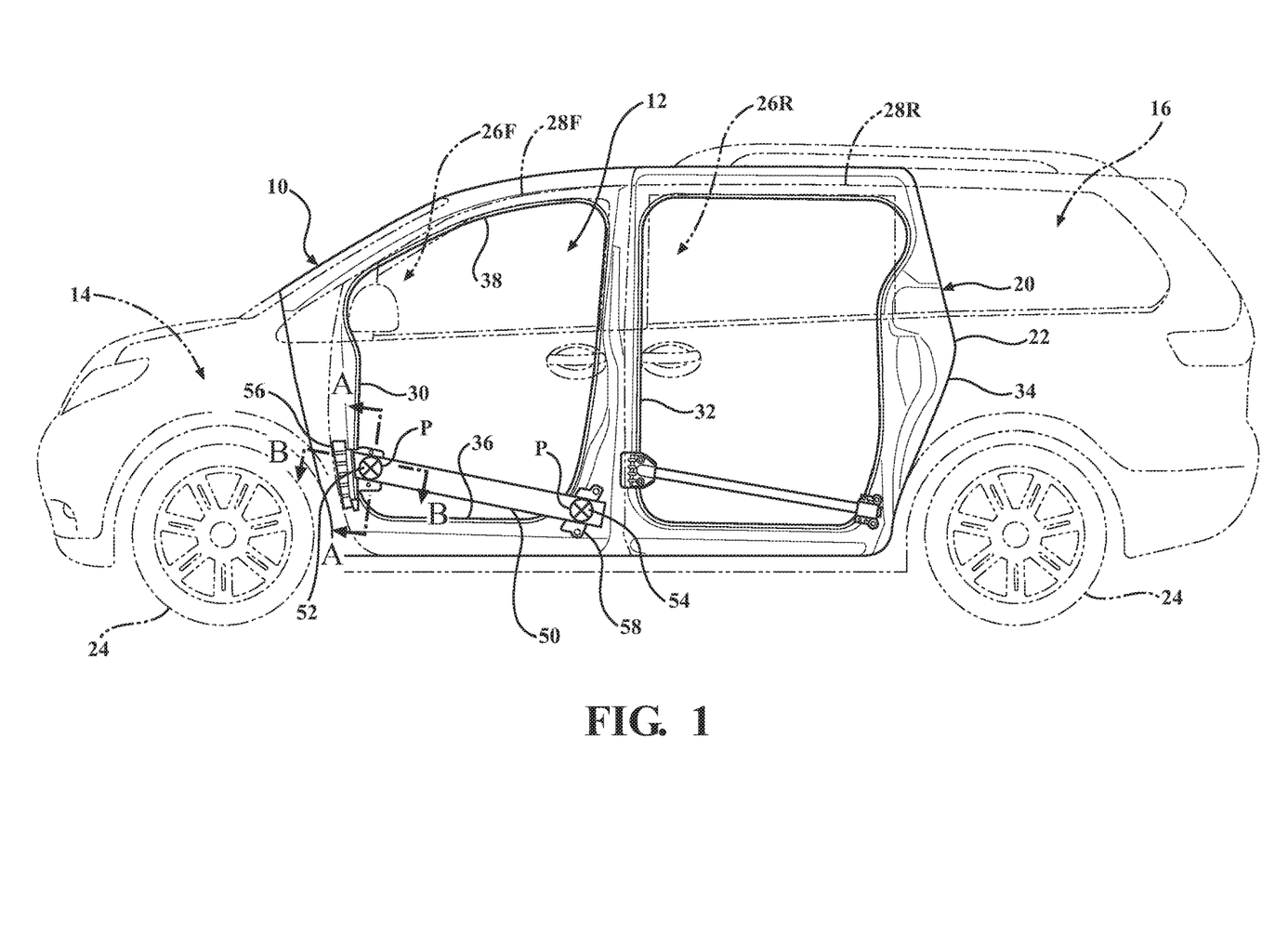
FIG. 1 is a side view of a vehicle whose outline is rendered with phantom lines and whose body is partially rendered with solid lines, showing a front door opening framed by an A-pillar, a front door corresponding to the front door opening, and an impact beam housed by the front door.

A representative passenger vehicle 10 is shown in FIG. 1. In this description, uses of "front," "forward" and the like, and uses of "rear," "rearward" and the like, refer to the longitudinal directions of the vehicle 10. "Front," "forward" and the like refer to the front (fore) of the vehicle 10, while "rear," "rearward" and the like refer to the back (aft) of the vehicle 10. Uses of "side," "sideways," "transverse" and the like refer to the lateral directions of the vehicle 10, with "driver's side" and the like referring to the left side of the vehicle 10, and "passenger side" and the like referring to the right side of the vehicle 10.

The vehicle 10 has an exterior and a number of interior compartments. The compartments include a passenger compartment 12, an engine compartment 14 and, in the illustrated minivan configuration of the vehicle 10, a cargo area 16. The vehicle 10 has a body 20 that forms its exterior and defines its compartments. The body 20 has two upright sides 22, as well as a floor, a front end, a rear end, a roof and the like.

The vehicle 10 may include, among other things, seats and a dash assembly housed in its passenger compartment 12. Additionally, the vehicle 10 may include an engine, motor, transmission and other powertrain components housed in its engine compartment 14 or elsewhere in the vehicle 10. Among the other powertrain components, the vehicle 10 includes wheels 24. The wheels 24 support the remainder of the vehicle 10 on the ground. One, some or all of the wheels 24 are powered by the remainder of the powertrain components to drive the vehicle 10 along the ground.

The body 20 is constructed from rigidly interconnected frame members, panels and other body elements, as well as any combination of overlying paneling, trim, upholstery and other body coverings. The body elements may be made from stamped metal or any other suitable material or combination of materials.

The body 20 defines a number of door openings 26 that open between the passenger compartment 12 and the exterior. Relatedly, the body 20 includes a number of doors 28 corresponding to the door openings 26. The doors 28 serve as closure panels for the passenger compartment 12. Each door 28 is pivotally, slidingly or otherwise connected to the remainder of the body 20 for movement, relative to a corresponding door opening 26, between a closed position and an open position. Each door 28 has a peripheral door area. In the closed position, each door 28 is positioned over a corresponding door opening 26. With the corresponding door opening 26 framed by the surrounding body 20, each door 28 overlaps the surrounding body 20 at the peripheral door area. In the open position, each door 28 is positioned away from the corresponding door opening 26, which allows ingress into and egress out of the passenger compartment 12.

One driver's side upright side 22 is shown, with the other, passenger side upright side 22, being a mirror image. As part of the upright side 22, the body 20 includes an upright A-pillar 30, an upright B-pillar 32 and an upright C-pillar 34, as well as a floor rail 36 and a roof rail 38. The A-pillar 30, the B-pillar 32 and the C-pillar 34 are longitudinally spaced apart from one another, with the A-pillar 30 forward of the B-pillar 32 and the C-pillar 34, and the B-pillar 32 forward of the C-pillar 34. The floor rail 36 and the roof rail 38 are vertically spaced apart from one another, and each extend longitudinally between the A-pillar 30, the B-pillar 32 and the C-pillar 34.

At the upright side 22, the body 20 defines a front door opening 26F between the A-pillar 30 and the B-pillar 32, and a rear door opening 26R between the B-pillar 32 and the C-pillar 34. Relatedly, as part of the upright side 22, the body 20 includes an upright front door 28F corresponding to the front door opening 26F, and an upright rear door 28R corresponding to the rear door opening 26R. In the illustrated minivan configuration of the vehicle 10, the front door 28F is pivotally connected to the remainder of the body 20, and the rear door 28R is slidingly connected to the remainder of the body 20. This description follows with reference to the front door 28F of the driver's side upright side 22 or, in other words, the driver's side front door 28F. However, it will be understood that this disclosure is applicable in principle to the remaining doors 28, including but not limited to the front door 28F of the passenger side upright side 22 or, in other words, the passenger side front door 28F.

Figure 2:
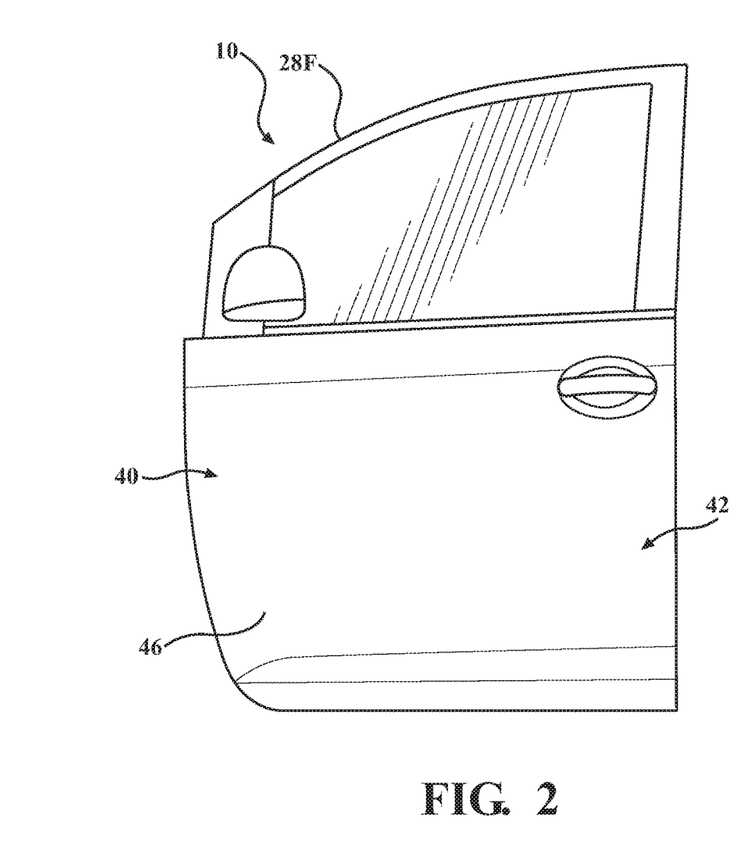
FIG. 2 is a front view of the front door, showing an outer door panel.
Figure 3:
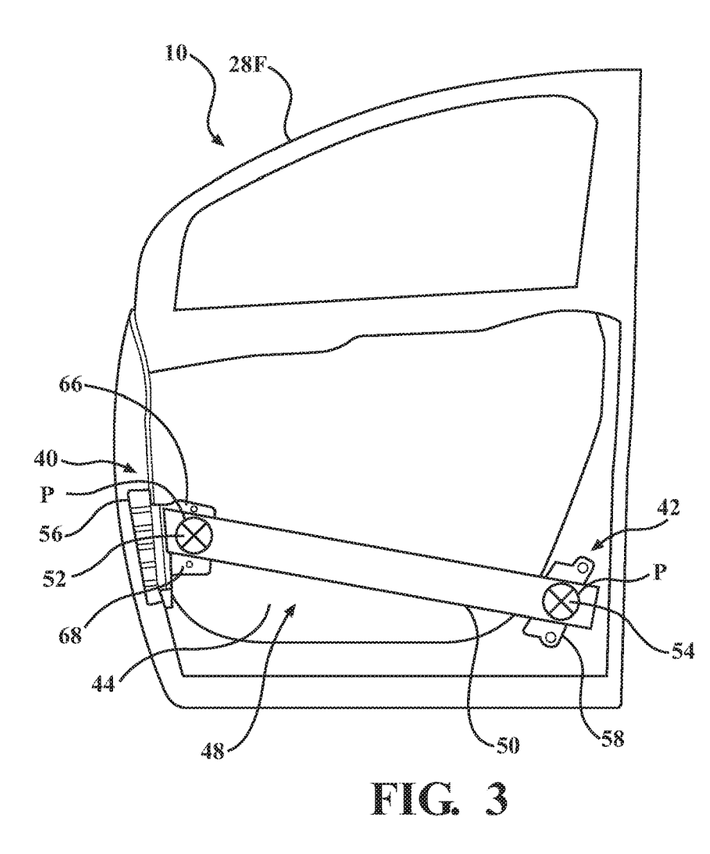
FIG. 3 is a front view of the front door with the outer door panel removed, showing an inner door panel and a forward support bracket supporting a forward end of the impact beam.
Figure 4:
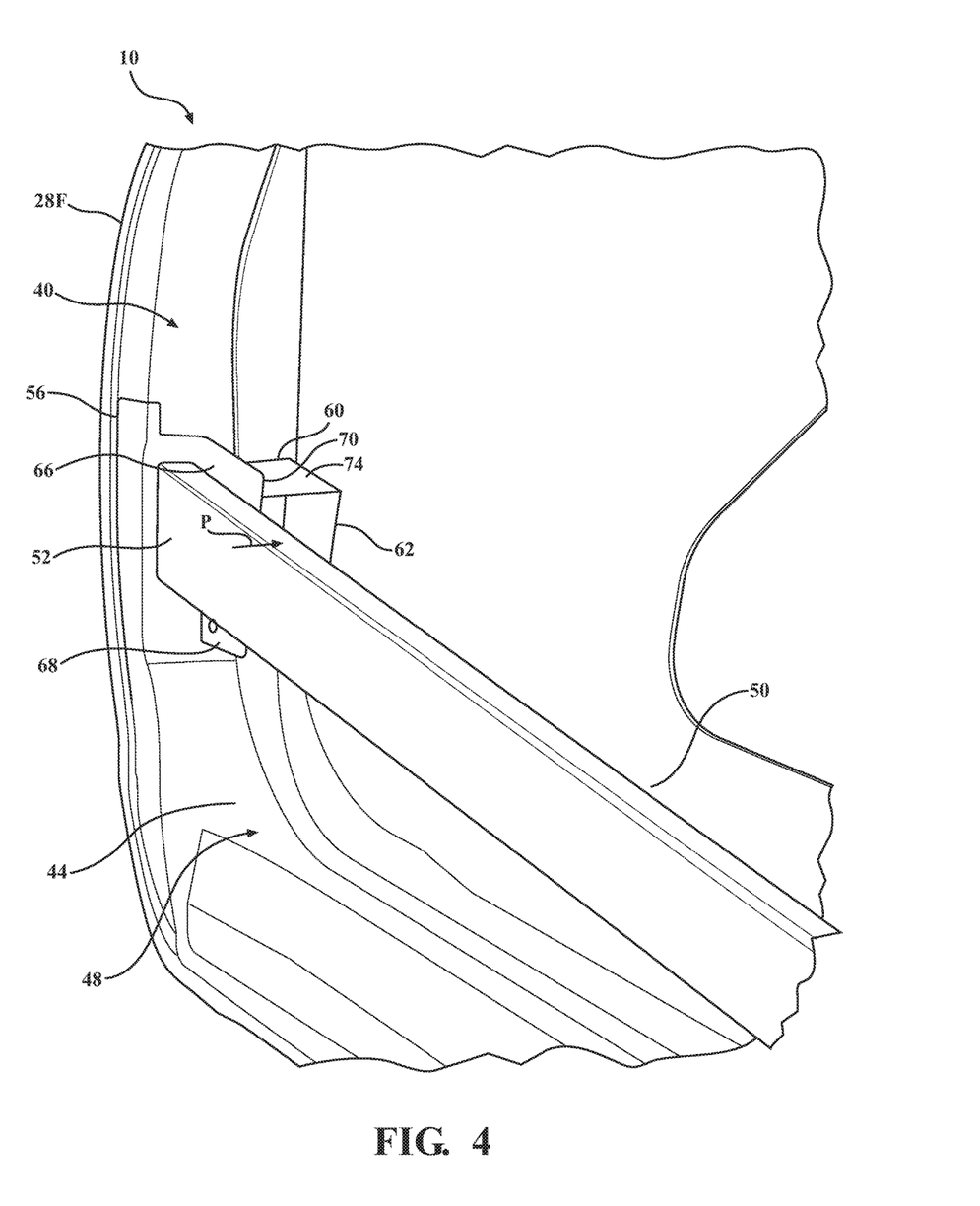
FIG. 4 is a cutaway partial perspective view of the front door, showing the forward support bracket further supporting a transfer member, with the transfer member facing the inner door panel from laterally between the forward end of the impact beam and the inner door panel.
Figure 5:
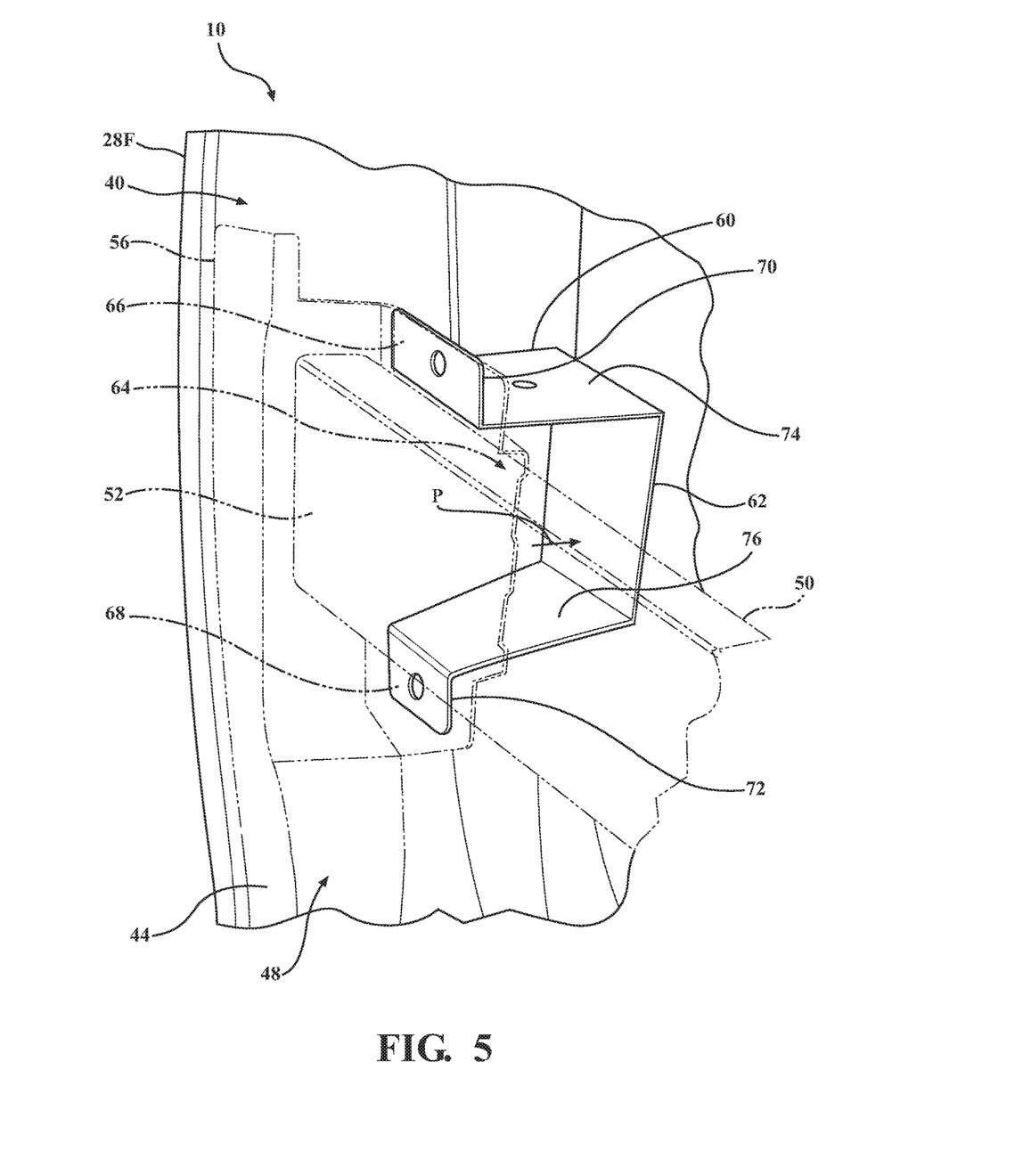
FIG. 5 is a detailed cutaway partial perspective view of the front door, showing the transfer member in additional detail.
Figure 6:
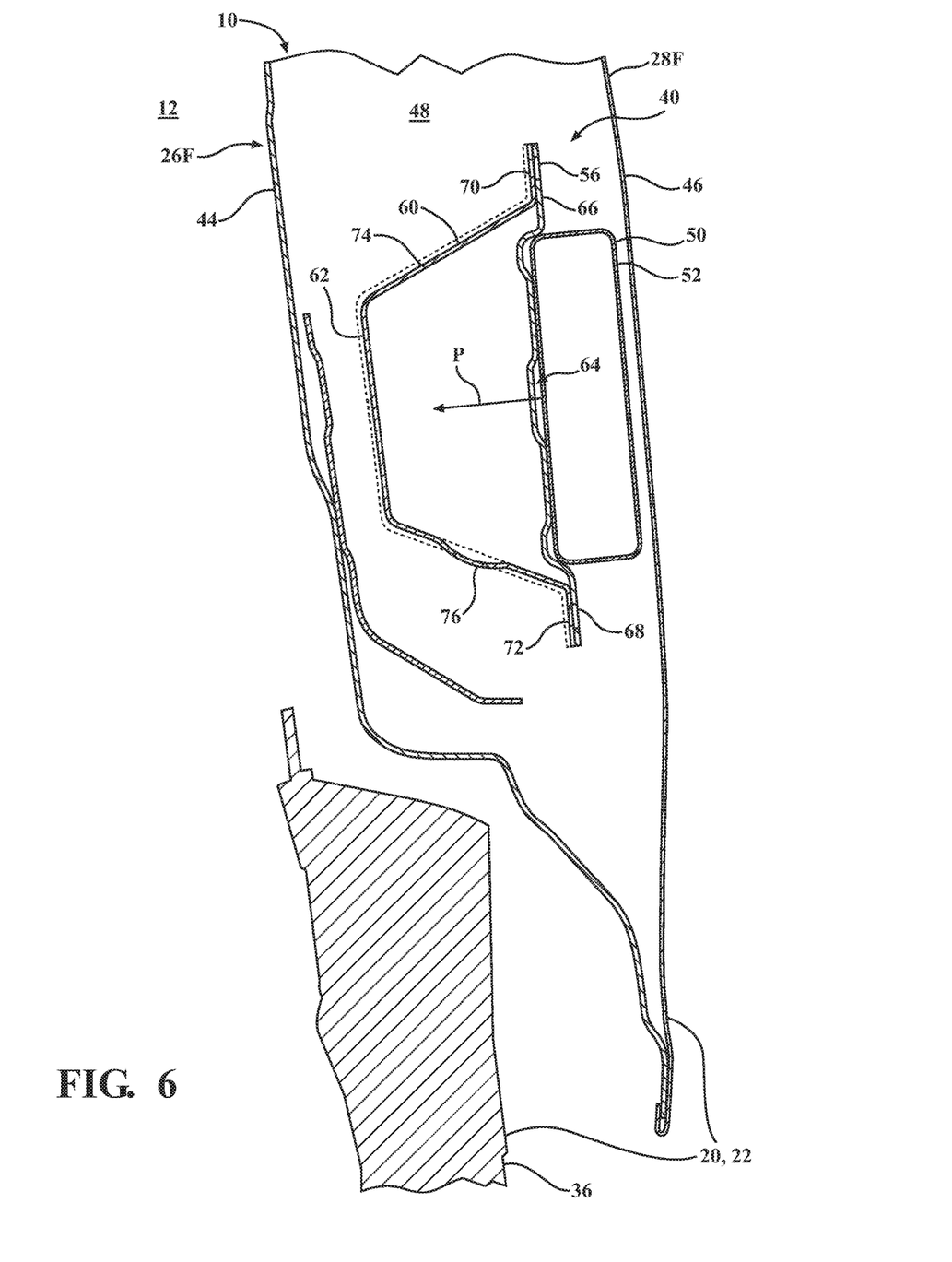
FIG. 6 is a cross sectional view of the front door along the line A-A in FIG. 1, further showing the forward end of the impact beam, the forward support bracket, the transfer member and the inner door panel.
Figure 7:
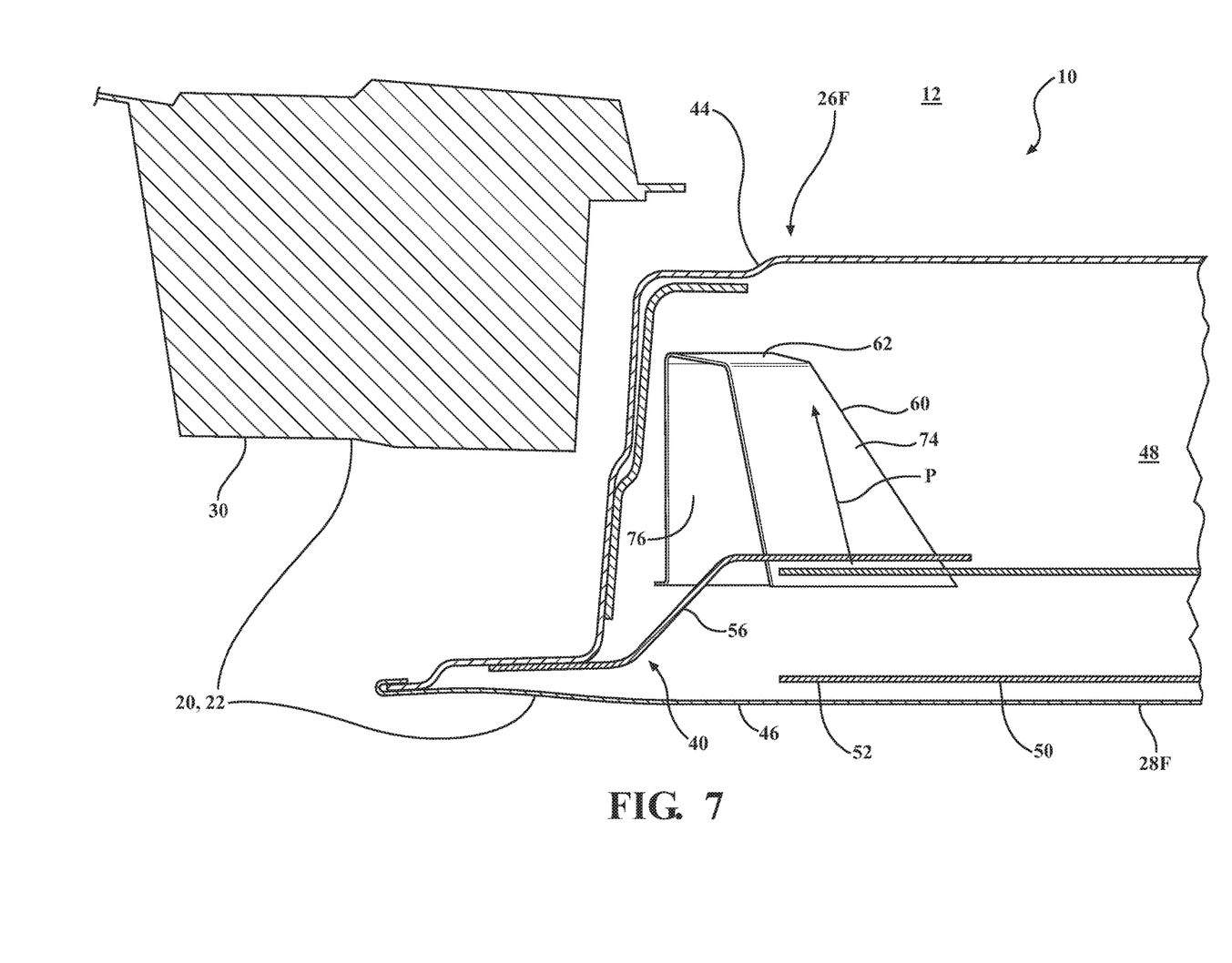
FIG. 7 is a cross sectional view of the front door along the line B-B in FIG. 1, further showing the forward end of the impact beam, the forward support bracket, the transfer member and the inner door panel, as well as the A-pillar.

As shown with additional reference to FIGS. 2 and 3, the front door 28F has a peripheral door area that includes a forward peripheral door area 40 and a rearward peripheral door area 42. In the closed position, the front door 28F is positioned over the front door opening 26F. With the A-pillar 30 and the B-pillar 32 serving as the surrounding body 20 framing the front door opening 26F, the door 28 laterally overlaps the A-pillar 30 at the forward peripheral door area 40, and laterally overlaps the B-pillar 32 at the rearward peripheral door area 42.

The front door 28F includes an upright inner door panel 44 and an upright outer door panel 46. The inner door panel 44 and the outer door panel 46 are hemmed together or otherwise rigidly interconnected to one another along the peripheral door area. Otherwise, the inner door panel 44 and the outer door panel 46 are laterally spaced apart from one another. As a result, the front door 28F has an interior door cavity 48 defined between the inner door panel 44 and the outer door panel 46.

Also as part of the upright side 22, and among other things housed by the front door 28F in the space afforded by the interior door cavity 48, the body 20 includes an elongate impact beam 50. The impact beam 50 is rigidly mounted to the front door 28F. The impact beam 50 has two opposing ends 52, 54, and longitudinally extends across the front door 28F. With the impact beam 50 longitudinally extending across the front door 28F, one of the opposing ends 52, 54 is a forward end 52 at the forward peripheral door area 40, and one of the opposing ends 52, 54 is a rearward end 54 at the rearward peripheral door area 42. Relatedly, with the front door 28F in the closed position, the impact beam 50 is positioned over the front door opening 26F. Moreover, the impact beam 50 laterally overlaps the A-pillar 30 at its forward end 52, and laterally overlaps the B-pillar 32 at its rearward end 54.

In the same space as the impact beam 50, the front door 28F includes an upright forward support bracket 56 and an upright rearward support bracket 58 therefor. The forward support bracket 56 is welded to the inner door panel 44 or otherwise rigidly interconnected with the remainder of the front door 28F at the forward peripheral door area 40. The rearward support bracket 58 is welded to the inner door panel 44 or otherwise rigidly interconnected with the remainder of the front door 28F at the rearward peripheral door area 42. The impact beam 50 is welded to or otherwise rigidly connected to the forward support bracket 56 at its forward end 52, and is welded to or otherwise rigidly connected to the rearward support bracket 58 at its rearward end 54. With the impact beam 50 connected between them, the forward support bracket 56 and the rearward support bracket 58, on behalf of the front door 28F, together support the impact beam 50 by its forward end 52 and its rearward end 54, respectively.

The body 20 imparts structure to the vehicle 10, including when the vehicle 10 experiences side impact events or, in other words, lateral collisions between the vehicle 10 and an external object at the upright side 22 of the body 20. Relatedly, when the vehicle 10 experiences side impact events, the body 20 plays a principal role in assuming associated side impact energy on behalf of the vehicle 10. Generally speaking, the body 20 is compromise resistant or, in other words, resistant to being compromised by side impact events. At the same time, by design, the body 20 may be otherwise compromise susceptible or, in other words, somewhat susceptible to being compromised by side impact events. Similarly to the body 20 to which it belongs, each body element may be compromise resistant, but otherwise compromise susceptible.

Both the body 20 and each body element have a compromise resistance or, in other words, resistance to resist being compromised by side impact events, and a compromise susceptibility or, in other words, susceptibility to otherwise being compromised by side impact events. Correspondingly, both the body 20 and each body element have a transfer capacity or, in other words, capacity to transfer side impact energy, and an absorption capacity or, in other words, capacity to absorb un-transferred side impact energy. In the cases of both the body 20 and each body element, its compromise resistance and its compromise susceptibility have an inverse relationship with one another, and its corresponding transfer capacity and its corresponding absorption capacity have an inverse relationship with one another.

The body 20 or each body element, as the case may be, transfers side impact energy according to its transfer capacity, as the product of resisting being compromised by side impact events according to its corresponding compromise resistance. At the same time, the body 20 thus generally maintains the passenger compartment 12, and each body element may play a role in generally maintaining the passenger compartment 12 on behalf of the body 20. On the other hand, the body 20 or each body element, as the case may be, absorbs un-transferred side impact energy according to its absorption capacity, as the product of otherwise being compromised by side impact events according to its corresponding compromise susceptibility.

In relation to being compromise resistant, but otherwise compromise susceptible, the body 20 assumes side impact energy, transfers some side impact energy into, among other things, kinetic energy, and absorbs remaining, un-transferred side impact energy. Each body element may either directly assume side impact energy from an external object or assume side impact energy via transfer from one or more preceding body elements, or both. Upon assuming side impact energy, each body element may transfer no or some side impact energy to one or more succeeding body elements, and absorb any remaining, un-transferred side impact energy.

At the upright side 22, from the perspective of the A-pillar 30 and the B-pillar 32 serving as succeeding body elements, the front door 28F and the impact beam 50 serve as a preceding body elements for transferring side impact energy to the A-pillar 30 and to the B-pillar 32. In the cases of both the front door 28F and the impact beam 50, in their positions over the front door opening 26F, their compromise resistance and transfer capacity, and inversely related compromise susceptibility and absorption capacity, are principally in bending.

By design, the front door 28F itself has a relatively lower compromise resistance and corresponding transfer capacity. When the vehicle 10 experiences side impact events, the front door 28F, if and when compromised thereby, collapses or, in other words, experiences lateral movement of the outer door panel 46 and the inner door panel 44 toward one another, and bows. The impact beam 50, on the other hand, has a relatively higher compromise resistance and corresponding transfer capacity. When the vehicle 10 experiences side impact events, the impact beam 50, if and when compromised thereby, bows somewhat. Nonetheless, with the front door 28F collapsing and bowing when compromised thereby, the impact beam 50 structurally reinforces the body 20 against the front door 28F laterally intruding into the passenger compartment 12.

One way to manage side impact energy when the vehicle 10 experiences side impact events is to promote the assumption of side impact energy by both the A-pillar 30 and the B-pillar 32 via transfer from the impact beam 50. When the impact beam 50 assumes side impact energy, it transfers side impact energy to the A-pillar 30 or the B-pillar 32, as the case may be, under the application of "pushing" force thereto in a laterally outside-to-inside push direction P. In the case of the A-pillar 30, with the impact beam 50 laterally overlapping the A-pillar 30 at its forward end 52, the forward end 52 of the impact beam 50 transfers side impact energy to the A-pillar 30 under the application of pushing force thereto in the push direction P.

As shown with additional reference to FIGS. 4-7, the impact beam 50 has a home position. In normal operation of the vehicle 10, the front door 28F supports the impact beam 50 relative to the front door 28F in the home position. At the forward peripheral door area 40, as supported by the forward support bracket 56, the forward end 52 of the impact beam 50 is laterally spaced apart from the inner door panel 44. The forward end 52 of the impact beam 50 is laterally spaced apart from the outer door panel 46 as well.

Relatedly, for purposes of applying pushing force to the A-pillar 30 in the push direction P, in the same space as the forward end 52 of the impact beam 50, the body 20 includes a transfer member 60 therefor. The transfer member 60 is rigidly mounted to the front door 28F at the forward peripheral door area 40. The transfer member 60 neighbors the inner door panel 44 in the interior door cavity 48 from a location laterally between the forward end 52 of the impact beam 50 and the inner door panel 44. From the front door 28F, the transfer member 60 projects into the interior door cavity 48 in the push direction P toward the inner door panel 44 and laterally beyond the impact beam 50, and faces the inner door panel 44 in the push direction P. Specifically, the transfer member 60 faces the inner door panel 44 in the push direction P from laterally beyond the forward end 52 of the impact beam 50 at a distal, overhanging upright push face 62. At the push face 62, the transfer member 60 is laterally spaced apart from the inner door panel 44. With the front door 28F in the closed position, at the push face 62, the transfer member 60 laterally overlaps the A-pillar 30 in common with the forward end 52 of the impact beam 50.

In addition to supporting the forward end 52 of the impact beam 50, the forward support bracket 56 serves as such for the transfer member 60 as well. Specifically, the transfer member 60, like the forward end 52 of the impact beam 50, is welded to or otherwise rigidly connected to the forward support bracket 56. With the transfer member 60 connected to it, the forward support bracket 56, on behalf of the front door 28F, supports the transfer member 60. The forward support bracket 56 supports the forward end 52 of the impact beam 50 from a location laterally between the forward end 52 of the impact beam 50 and the inner door panel 44, and supports the transfer member 60 from a location laterally between the forward end 52 of the impact beam 50 and the transfer member 60. With the front door 28F in the closed position, the forward support bracket 56, similarly to the transfer member 60, laterally overlaps the A-pillar 30 in common with the forward end 52 of the impact beam 50.

The forward support bracket 56, as shown, is rendered by a standalone panel-like structure. From the inner door panel 44, the forward support bracket 56 projects into the interior door cavity 48, and longitudinally extends toward the rearward peripheral door area 42. From its location laterally between the forward end 52 of the impact beam 50 and the inner door panel 44, the forward support bracket 56 is laterally spaced apart from the inner door panel 44. The forward support bracket 56 is laterally spaced apart from the outer door panel 46 as well.

In relation to the forward end 52 of the impact beam 50, the forward support bracket 56 features a shallow, longitudinally-extending support pocket 64 opening in the push direction P. The forward end 52 of the impact beam 50 is located in the support pocket 64. From its location in the support pocket 64, the forward end 52 of the impact beam 50 is connected to the forward support bracket 56.

In relation to the transfer member 60, the forward support bracket 56 includes two opposing support flanges 66, 68 vertically bordering the support pocket 64, and thus vertically flanking the forward end 52 of the impact beam 50. With the support flanges 66, 68 vertically bordering the support pocket 64, one of the opposing support flanges 66, 68 is a distal, longitudinally-extending upper support flange 66, and one of the opposing support flanges 66, 68 is a distal, longitudinally-extending lower support flange 68. Relatedly, from the support pocket 64 and the forward end 52 of the impact beam 50, the upper support flange 66 and the lower support flange 68 each project into the interior door cavity 48, and face the inner door panel 44 in the push direction P.

The transfer member 60, as shown, is rendered by a standalone, longitudinally-extending hat-shaped structure. In addition to the push face 62, the transfer member 60 includes two opposing upright base flanges 70, 72 respectively corresponding to the support flanges 66, 68. With the base flanges 70, 72 respectively corresponding to the support flanges 66, 68, one of the opposing base flanges 70, 72 is a distal, longitudinally-extending upper base flange 70, and one of the opposing base flanges 70, 72 is a distal, longitudinally-extending lower base flange 72. With the support flanges 66, 68 laterally between the forward end 52 of the impact beam 50 and the base flanges 70, 72, the transfer member 60 is welded to or otherwise rigidly connected to the upper support flange 66 at its upper base flange 70, and is welded to or otherwise rigidly connected to the lower support flange 68 at its lower base flange 72. With the transfer member 60 connected between them, the upper support flange 66 and the lower support flange 68, on behalf of the forward support bracket 56, together support the transfer member 60 by its upper base flange 70 and its lower base flange 72, respectively. Moreover, the base flanges 70, 72, like the support flanges 66, 68, vertically flank the forward end 52 of the impact beam 50.

In addition to the push face 62 and the base flanges 70, 72, the transfer member 60 includes two opposing horizontal strut legs 74, 76 respectively extending from the base flanges 70, 72 in the push direction P toward the inner door panel 44, and laterally backing the push face 62. With the strut legs 74, 76 respectively extending from the base flanges 70, 72, one of the opposing strut legs 74, 76 is a laterally-projecting upper strut leg 74, and one of the opposing strut legs 74, 76 is a laterally-projecting lower strut leg 76. From the base flanges 70, 72, and thus the support flanges 66, 68, the strut legs 74, 76 respectively project into the interior door cavity 48 in the push direction P toward the inner door panel 44 and laterally beyond the impact beam 50. Moreover, the strut legs 74, 76, like the base flanges 70, 72 and the support flanges 66, 68, vertically flank the forward end 52 of the impact beam 50. The push face 62 extends between the strut legs 74, 76. With the push face 62 extending between the strut legs 74, 76, the transfer member 60 terminates at the push face 62.

The impact beam 50 principally functions once operation of the vehicle 10 is underway when, in the midst of normal operation of the vehicle 10, the vehicle 10 experiences side impact events. As shown with additional reference to FIG. 8 for a representative side impact event experienced by the vehicle 10, with the front door 28F compromised thereby, the impact beam 50 assumes side impact energy via transfer from the outer door panel 46.

Figure 8:
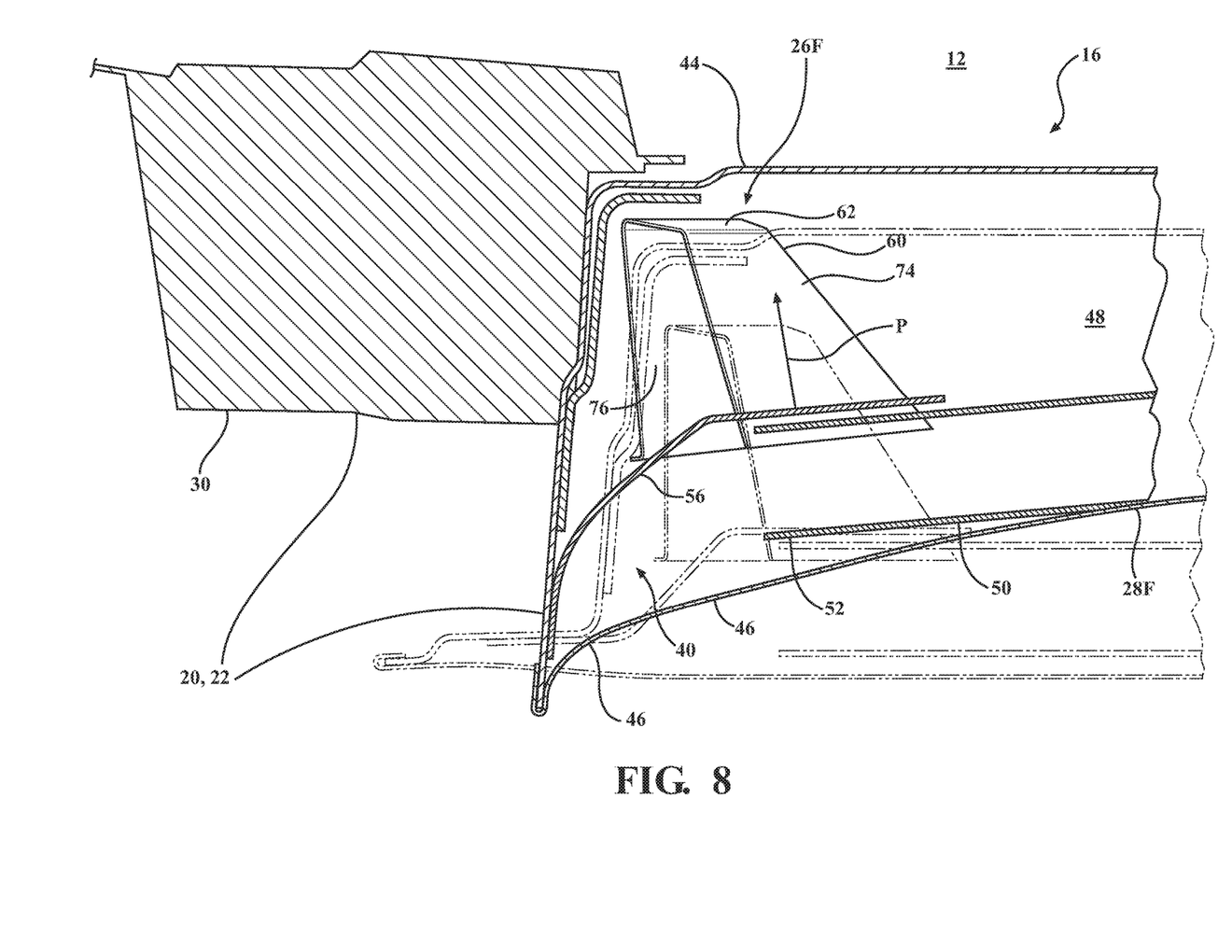
FIG. 8 is another cross sectional view of the front door along the line B-B in FIG. 1 when the vehicle experiences a representative side impact event, showing the A-pillar assuming side impact energy via transfer from the forward end of the impact beam through the forward support bracket, the transfer member and the inner door panel.

From the perspective of the A-pillar 30 serving as a succeeding body element, when the impact beam 50 assumes side impact energy, the A-pillar 30 assumes side impact energy via transfer from the forward end 52 of the impact beam 50 successively through the forward support bracket 56, the transfer member 60 and the inner door panel 44. Specifically, when the impact beam 50 assumes side impact energy, the forward end 52 of the impact beam 50 employs assumed side impact energy to forcibly engage the A-pillar 30 in the push direction P through the forward support bracket 56, the transfer member 60 and the inner door panel 44. Afterward, with the forward end 52 of the impact beam 50 forcibly engaging the A-pillar 30 in the push direction P therethrough, the forward end 52 of the impact beam 50 applies pushing force to the A-pillar 30 in the push direction P through the forward support bracket 56, the transfer member 60 and the inner door panel 44. And, with the forward end 52 of the impact beam 50 applying pushing force to the A-pillar 30 in the push direction P therethrough, the forward end 52 of the impact beam 50 thereby transfers side impact energy to the A-pillar 30 through the forward support bracket 56, the transfer member 60 and the inner door panel 44.

In relation to the A-pillar 30 assuming side impact energy via transfer from the forward end 52 of the impact beam 50 through the forward support bracket 56 and the inner door panel 44, the forward end 52 of the impact beam 50 carries the transfer member 60 on the forward support bracket 56. Otherwise, the forward support bracket 56 and the inner door panel 44 themselves, as part of the front door 28F with a relatively lower compromise resistance and corresponding transfer capacity, are compromised by the representative side impact event, and play a limited role.

On the other hand, in relation to the A-pillar 30 assuming side impact energy via transfer from the forward end 52 of the impact beam 50 through the transfer member 60, the transfer member 60 plays a promoting role. For instance, initially, the transfer member 60 advances the timing of the A-pillar 30 assuming side impact energy via transfer from the forward end 52 of the impact beam 50. Specifically, as noted above, in normal operation of the vehicle 10, the forward end 52 of the impact beam 50 is laterally spaced apart from the inner door panel 44. As a result, when the impact beam 50 assumes side impact energy, as a prerequisite to forcibly engaging the A-pillar 30 in the push direction P, the forward end 52 of the impact beam 50 closes in the push direction P on the inner door panel 44. With the transfer member 60 laterally between the forward end 52 of the impact beam 50 and the inner door panel 44, the forward end 52 of the impact beam 50 closes in the push direction P on the inner door panel 44 through the transfer member 60. Among other things, with the impact beam 50 closing in the push direction P on the inner door panel 44 therethrough, the transfer member 60 advances the timing of the forward end 52 of the impact beam 50 closing in the push direction P on the inner door panel 44, and thereafter forcibly engaging the A-pillar 30 in the push direction P. By extension, the transfer member 60 advances the timing of the forward end 52 of the impact beam 50 afterward applying pushing force to the A-pillar 30 in the push direction P, and thereby transferring side impact energy to the A-pillar 30.

Moreover, thereafter, the transfer member 60 effectuates the A-pillar 30 assuming side impact energy via transfer from the forward end 52 of the impact beam 50. Specifically, in its location laterally between the forward end 52 of the impact beam 50 and the inner door panel 44, the compromise resistance and corresponding transfer capacity of the transfer member 60 are principally in compression. With the forward end 52 of the impact beam 50 serving as a preceding body element for transferring side impact energy to the transfer member 60, from its own perspective serving as a succeeding body element, the transfer member 60 has substantially the same or otherwise substantially at least as much compromise resistance and corresponding transfer capacity as the impact beam 50 has at the forward end 52. As a result, upon assuming side impact energy via transfer from the forward end 52 of the impact beam 50 according to the transfer capacity thereof, from its own perspective as a now-preceding body element, the transfer member 60 is substantially not compromised by the representative side impact event, and transfers substantially all assumed side impact energy. At the same time, the compromise resistance and corresponding transfer capacity of the transfer member 60 are optimized to avoid unnecessary weight penalties, packaging issues and the like.

Relatedly, the transfer member 60 features a compression resistant structure in the push direction P. For instance, as rendered by the hat-shaped structure, the transfer member 60 includes the strut legs 74, 76 laterally backing the push face 62. With the strut legs 74, 76 extending in the push direction P toward the inner door panel 44, the strut legs 74, 76, on behalf of the transfer member 60, are compression resistant in the push direction P.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
    a body defining a front door opening, the body including an A-pillar framing the front door opening, and a front door over the front door opening, the front door including an inner door panel and an outer door panel defining an interior door cavity therebetween;
    an impact beam housed in the interior door cavity, the impact beam having a forward end laterally overlapping the A-pillar; and
    a transfer member housed in the interior door cavity, the transfer member laterally overlapping the A-pillar in common with the forward end of the impact beam, facing the inner door panel from laterally between the forward end of the impact beam and the inner door panel, and having substantially at least as much capacity to transfer side impact energy in compression as the impact beam has in bending at the forward end thereof; whereby
    when the vehicle experiences a side impact event, the A-pillar assumes side impact energy via transfer from the forward end of the impact beam through the transfer member.

2. The vehicle of claim 1, wherein the transfer member has substantially the same capacity to transfer side impact energy in compression as the impact beam has in bending at the forward end thereof.

3. The vehicle of claim 1, wherein the transfer member is laterally spaced apart from the inner door panel.

4. The vehicle of claim 1, wherein the transfer member includes a push face at which the transfer member faces the inner door panel from laterally between the forward end of the impact beam and the inner door panel.

5. The vehicle of claim 4, wherein the transfer member includes at least one strut leg laterally backing the push face.

6. The vehicle of claim 5, wherein the transfer member includes opposing strut legs projecting into the interior door cavity toward the inner door panel and laterally beyond the impact beam, and the push face extends between the strut legs.

7. The vehicle of claim 6, wherein the strut legs vertically flank the forward end of the impact beam.

8. The vehicle of claim 4, wherein, at the push face, the transfer member is laterally spaced apart from the inner door panel.

9. A vehicle, comprising:
    a body defining a front door opening, the body including an A-pillar framing the front door opening, and a front door over the front door opening, the front door including an inner door panel and an outer door panel defining an interior door cavity therebetween;
    an impact beam housed in the interior door cavity, the impact beam having a forward end laterally overlapping the A-pillar; and a transfer member housed in the interior door cavity, the transfer member laterally overlapping the A-pillar in common with the forward end of the impact beam, and including opposing strut legs projecting into the interior door cavity toward the inner door panel and laterally beyond the impact beam, and a push face extending between and laterally backed by the strut legs at which the transfer member faces the inner door panel from laterally between the forward end of the impact beam and the inner door panel; whereby when the vehicle experiences a side impact event, the A-pillar assumes side impact energy via transfer from the forward end of the impact beam through the transfer member.

10. The vehicle of claim 9, wherein the transfer member has substantially at least as much capacity to transfer side impact energy in compression as the impact beam has in bending at the forward end thereof.

11. The vehicle of claim 10, wherein the transfer member has substantially the same capacity to transfer side impact energy in compression as the impact beam has in bending at the forward end thereof.

12. The vehicle of claim 9, wherein the strut legs vertically flank the forward end of the impact beam.

13. The vehicle of claim 9, wherein, at the push face, the transfer member is laterally spaced apart from the inner door panel.

14. A vehicle, comprising:
a body defining a front door opening, the body including an A-pillar framing the front door opening, and a front door over the front door opening, the front door including an inner door panel and an outer door panel defining an interior door cavity therebetween, and a forward support bracket laterally spaced apart from the outer door panel;
an impact beam housed in the interior door cavity, the impact beam having a forward end supported by the forward support bracket and laterally overlapping the A-pillar; and
a transfer member housed in the interior door cavity, the transfer member supported by the forward support bracket and laterally overlapping the A-pillar in common with the forward end of the impact beam, projecting from the forward support bracket into the interior door cavity toward the inner door panel, and facing the inner door panel from laterally between the forward end of the impact beam and the inner door panel; whereby
when the vehicle experiences a side impact event, the A-pillar assumes side impact energy via transfer from the forward end of the impact beam through the transfer member.

15. The vehicle of claim 14, wherein the transfer member has substantially at least as much capacity to transfer side impact energy in compression as the impact beam has in bending at the forward end thereof.

16. The vehicle of claim 14, wherein the transfer member has substantially the same capacity to transfer side impact energy in compression as the impact beam has in bending at the forward end thereof.

17. The vehicle of claim 14, wherein the forward support bracket is laterally between the forward end of the impact beam and the inner door panel, and the transfer member includes opposing strut legs projecting from the forward support bracket into the interior door cavity toward the inner door panel and laterally beyond the impact beam, and a push face extending between the strut legs at which the transfer member faces the inner door panel from laterally between the forward end of the impact beam and the inner door panel.

18. The vehicle of claim 17, wherein the strut legs vertically flank the forward end of the impact beam.

19. The vehicle of claim 17, wherein, at the push face, the transfer member is laterally spaced apart from the inner door panel.

20. The vehicle of claim 14, wherein the forward support bracket is laterally between the forward end of the impact beam and the inner door panel and includes opposing support flanges, and the transfer member includes opposing base flanges respectively corresponding to the support flanges and connected thereto, opposing strut legs respectively projecting from the base flanges into the interior door cavity toward the inner door panel and laterally beyond the impact beam, and a push face extending between the strut legs at which the transfer member faces the inner door panel from laterally between the forward end of the impact beam and the inner door panel.

21. The vehicle of claim 20, wherein the support flanges vertically flank the forward end of the impact beam.

22. The vehicle of claim 20, wherein, at the push face, the transfer member is laterally spaced apart from the inner door panel.

23. A vehicle, comprising:
a body defining a front door opening, the body including an A-pillar framing the front door opening, and a front door over the front door opening, the front door including an inner door panel and an outer door panel defining an interior door cavity therebetween, and a forward support bracket laterally spaced apart from the outer door panel from laterally between the forward end of the impact beam and the inner door panel, the forward support bracket including opposing support flanges;
an impact beam housed in the interior door cavity, the impact beam having a forward end supported by the forward support bracket in a vertically flanked relationship with the support flanges, and laterally overlapping the A-pillar; and
a transfer member housed in the interior door cavity, the transfer member including opposing base flanges respectively corresponding to the support flanges and connected thereto, opposing strut legs respectively projecting from the base flanges into the interior door cavity toward the inner door panel and laterally beyond the impact beam, and a push face extending between the strut legs, laterally overlapping the A-pillar in common with the forward end of the impact beam, and facing the inner door panel from laterally between the forward end of the impact beam and the inner door panel; whereby
the transfer member has substantially at least as much capacity to transfer side impact energy in compression as the impact beam has in bending at the forward end thereof, and when the vehicle experiences a side impact event, with the transfer member transferring substantially all assumed side impact energy, the A-pillar assumes side impact energy via transfer from the forward end of the impact beam through the transfer member.

24. The vehicle of claim 23, wherein the transfer member has substantially the same capacity to transfer side impact energy in compression as the impact beam has in bending at the forward end thereof.

* * * * *